United States Patent
Neumetzler et al.

(10) Patent No.: US 7,037,118 B2
(45) Date of Patent: May 2, 2006

(54) ACCESS MODULE

(75) Inventors: Heiko Neumetzler, Berlin (DE); Harald Klein, Berlin (DE); Antony Nijhuis, Modautal-Brandau (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 10/938,342

(22) Filed: Sep. 9, 2004

(65) Prior Publication Data

US 2005/0106942 A1    May 19, 2005

(30) Foreign Application Priority Data

Sep. 10, 2003  (DE) ................................ 103 41 694

(51) Int. Cl.
*H01R 12/00*    (2006.01)

(52) U.S. Cl. .................... 439/76.1; 439/92; 439/404

(58) Field of Classification Search .............. 439/76.1, 439/404, 45, 92, 95, 607, 609
See application file for complete search history.

(56) References Cited

U.S. PATENT DOCUMENTS

| | | | | |
|---|---|---|---|---|
| 5,503,572 A * | 4/1996 | White et al. | ................. | 439/676 |
| 5,620,331 A * | 4/1997 | Los et al. | .................... | 439/404 |
| 5,718,593 A * | 2/1998 | Figueiredo et al. | ......... | 439/76.1 |
| 6,608,764 B1 * | 8/2003 | Clark et al. | ................. | 361/796 |
| 6,830,465 B1 * | 12/2004 | Norris et al. | ............... | 439/76.1 |
| 6,884,117 B1 * | 4/2005 | Korsunsky et al. | ......... | 439/607 |
| 2003/0156389 A1 | 8/2003 | Busse et al. | | |
| 2004/0235321 A1 * | 11/2004 | Mizumura et al. | ............ | 439/92 |

FOREIGN PATENT DOCUMENTS

| | | |
|---|---|---|
| DE | 199 45 412 A1 | 3/2000 |
| DE | 100 29 649 | 1/2002 |
| WO | 01/97339 A1 | 12/2001 |

* cited by examiner

*Primary Examiner*—Gary Paumen
(74) *Attorney, Agent, or Firm*—Merchant & Gould P.C.

(57) ABSTRACT

The invention relates to an access module (1) for telecommunications and data technology, having a housing in which externally accessible input and output contacts for connection of lines and wires are arranged, with the housing having a cavity in which at least one printed circuit board (6) is arranged, with the input and output contacts being arranged on opposite end faces of the housing, with the input contacts being in the form of at least one connecting strip (5) with insulation-displacement terminal contacts (41), and the output contacts being in the form of at least one plug connector (8), with the housing having at least two parts, with a front housing part (2) being fitted with the input contacts and the printed circuit board (6), and a rear housing part (3) being detachably connectable to the front housing part (2), with the rear housing part (3) having at least one outward bulge (9), and with the plug connector being arranged behind the outward bulge (9).

10 Claims, 4 Drawing Sheets

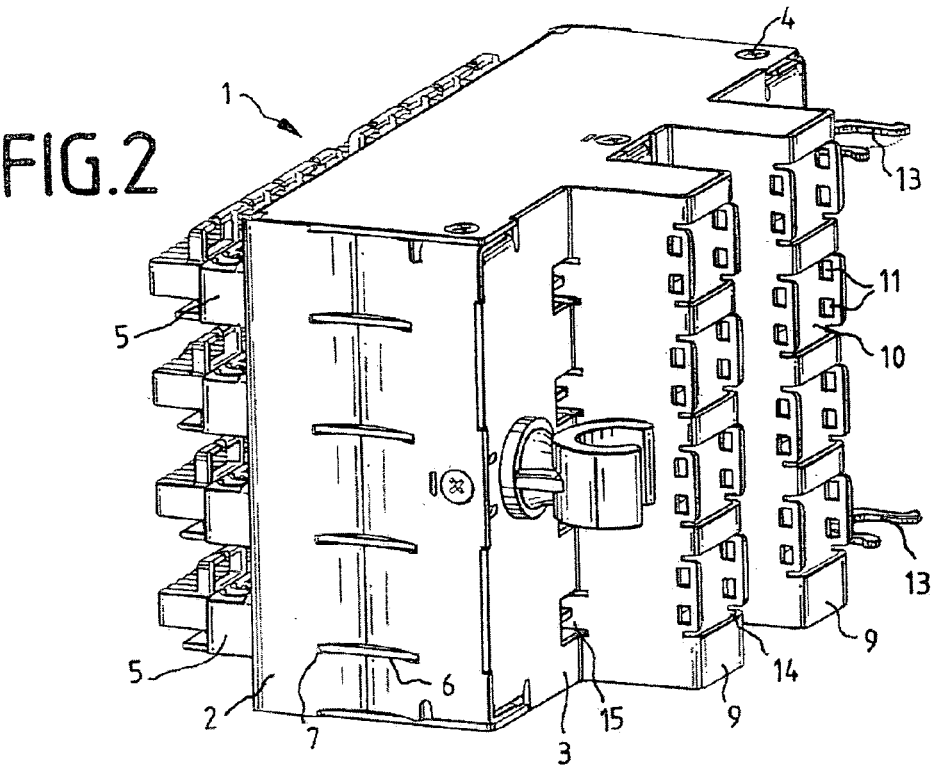
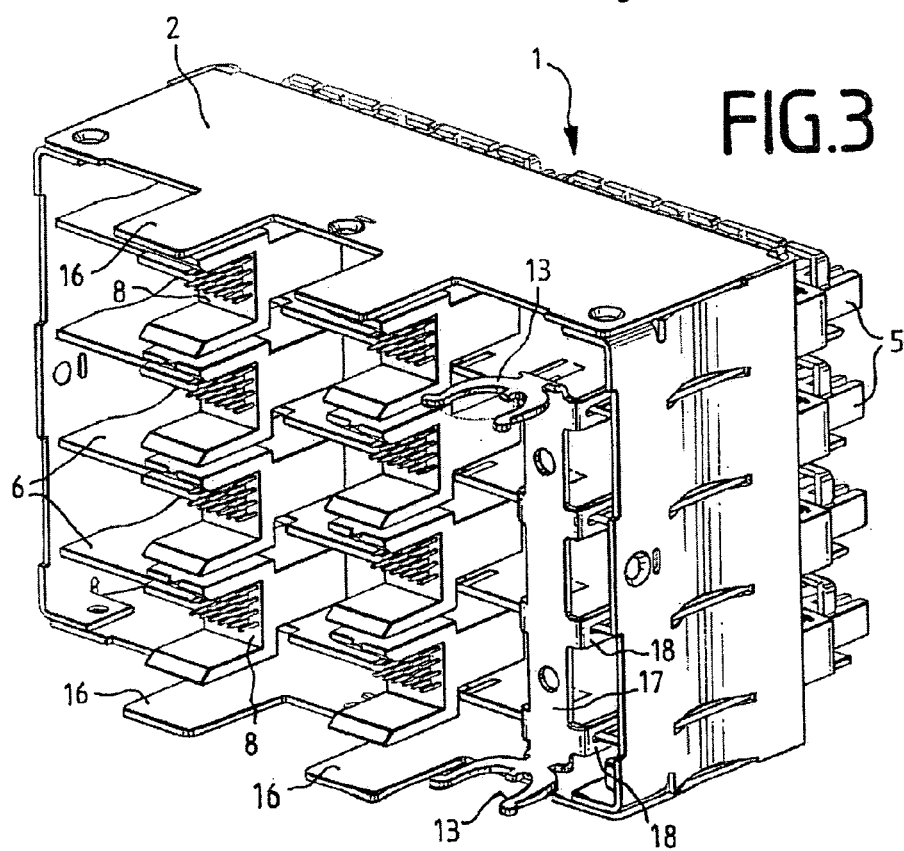

ACCESS MODULE

The invention relates to an access module as claimed in the preamble of claim 1.

Access module such as these are used, for example, in main distribution boards or colocation distribution boards for telecommunications and data technology, and are used for connection and jumpering of incoming and outgoing cable wires.

DE 100 29 649 A1 discloses a distribution access module for telecommunications and data technology, having a housing in which externally accessible input and output contacts for connection of lines or wires are arranged, with the housing having a cavity in which functional elements are arranged between the input and output contacts. The input and output contacts are arranged on opposite end faces of the housing. The functional elements are arranged on at least one printed circuit board, which is supported in the housing. The input contacts are in the form of insulation-displacement terminal contacts, with the output contacts likewise being in the form of insulation-displacement terminal contacts or in the form of an electrical plug connector. The insulation-displacement terminal contacts preferably have a fork-shaped contact, by means of which a force-fitting electrical connection can be produced with the functional elements. In this case, a D-sub plug connector is proposed as the plug connector for the output contacts, by means of which a prefabricated cable can be connected.

The invention is based on the technical problem of providing an access module by means of which prefabricated cables can be connected better.

The technical problem is solved by the subject matter of the features of claim 1. Advantageous refinements of the invention may be found in the dependent claims.

For this purpose, the housing is in at least two parts, with a front housing part being fitted with the input contacts and the printed circuit board, and a rear housing part being detachably connected to the front housing part, with the rear housing part having at least one outward bulge, behind which the plug connector is arranged. This makes it possible to design the plug connector such that it forms a latching connection by means of the mating plug connector with the prefabricated cable, which can then easily be detached again by the capability to engage around the outward bulge. The detachable configuration of the rear housing part means that the access module can be used very easily for different plug connectors since only the appropriate rear housing part for the plug connector need in each case be fitted. The matching is preferably provided by the shape of the plug connectors or by outward bulges, which are matched to the latching connection, on the rear housing part. However, the rear housing part may also have an indentation around the plug connector, so that the same effect can be achieved, that is to say to make it possible to engage around the rear housing part in the area of the plug connector.

In a further preferred embodiment, the rear housing part has at least one cuboid outward bulge, with the plug connector or connectors being arranged within the cuboid outward bulge. In this case, each plug connector may also have its own associated outward bulge or projection, so that the plug connector or mating plug connector can be gripped from all sides.

In a further preferred embodiment, the rear housing part is formed from an electrically conductive material, so that shielded plugs and mating plugs can very easily be connected to the shield potential.

In a further preferred embodiment, the access module has a ground rail, by means of which the printed circuit boards can be connected to ground potential.

For this purpose, the ground rail preferably has fork contacts, via which contact can be made with the printed circuit boards. The ground connection is particularly necessary for embodiments when functional elements which require a ground connection are arranged on the printed circuit board. Examples of this include overvoltage protective components such as gas arresters and diodes.

In a further preferred embodiment, the ground rail is electrically connected to the rear housing part. This provides shielding to ground which may be required for plugs and mating plugs, and is attached to the rear housing part.

In a further preferred embodiment, the ground rail has ground fork contacts, via which the access module can be connected to a round profile mounting system. The round profile mounting system not only makes it possible to produce the ground connection, but it also provides mechanical attachment for the access module.

In a further preferred embodiment, the front housing part is formed from plastic. In this case, in a further preferred embodiment, the front housing part may form a base part for the connecting strips of the insulation-displacement terminal contacts.

In a further preferred embodiment, the connecting strips are designed such that they can be connected to wires in advance, so that the fully connected connecting strip can then be pushed onto the printed circuit board retrospectively.

The invention will be explained in more detail in the following text with reference to a preferred exemplary embodiment. In the figures:

FIG. 2 shows a perspective rear view of the access module,

FIG. 3 shows a perspective rear view of the access module with the rear housing part removed.

Figure 1:
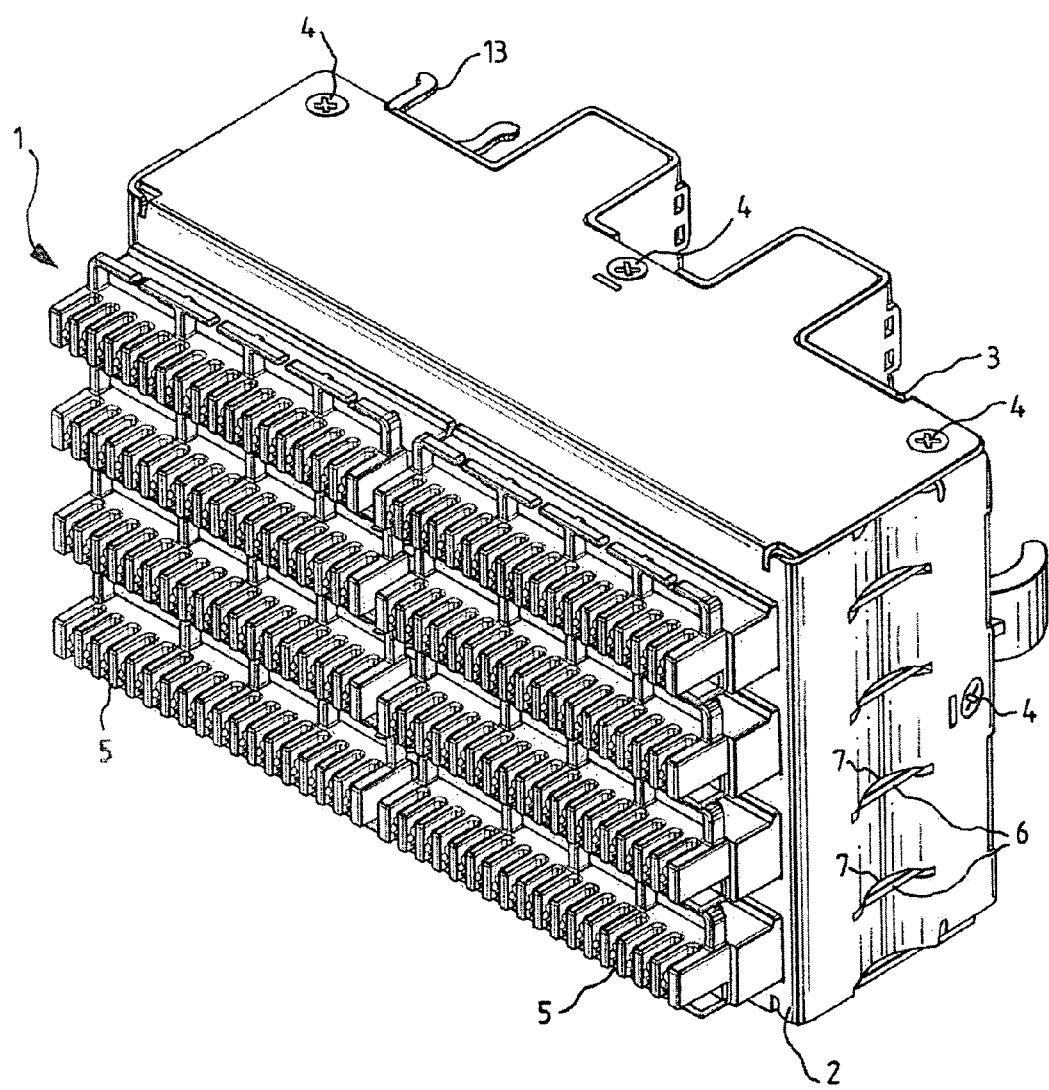
FIG. 1 shows a perspective front view of an access module.

FIGS. 1 and 2 show a perspective illustration of the access module 1. The access module 1 has a front housing part 2 and a rear housing part 3, which are detachably connected to one another via screws 4. Furthermore, the access module 1 has connecting strips 5 for insulation-displacement terminal contacts, with four connecting strips 5 being arranged one on top of the other, twice, in the illustrated exemplary embodiment. Four printed circuit boards 6 are arranged in the cavity between the front and the rear housing part 2, 3, and are supported within the housing. For this purpose, the front housing part 2 has guide slots 7 which form a contact surface on the inside. Eight electrical plug connectors 8 are arranged on the rear face of the access module 1, and are arranged on the printed circuit boards 6. The plug connectors 8 are connected either directly to the connecting strips 5 or else are connected to them via functional elements, with the connections being produced via the printed circuit boards 6. The functional elements which may be present, such as filter assemblies and/or overvoltage protective components, are likewise arranged on the printed circuit boards 6. In this case, it should be noted that each plug connector 8 may have an associated connecting strip 5. However, embodiments are also feasible in which the contacts of a plug connector 8 may be associated with different connecting strips 5. The rear housing part 3 has two cuboid outward bulges 9, behind which the plug connectors 8 are arranged. In this case, a holder 10 is cut out for each plug connector 8 in the outward bulges 9, in which holder 10 a mating plug connector can then be inserted. Latching openings 11 are arranged in the side of the holder 10, into which corresponding latching tabs or latching hooks on the mating plug connector can then be latched. A latching clip 12 is attached to the rear housing part 3, by means of which the access module 1 can be latched to a round profile mounting system, which is not illustrated. Two round profile fork contacts 13, which will be explained later in more detail with reference to FIG. 3, are arranged on the other side.

The cuboid outward bulges allow the plug connector 8 or the mating plug connector which is to be connected to it to be partially gripped, in the illustrated exemplary embodiment on the left and right. The latching can thus be manually released again very easily, which will be possible only with difficulty if the rear face were planar. The lower edges 14 of the holder 10 may in this case by used to support the mating plug connector. Furthermore, the rear housing part 3 is provided with openings 15 via which electrical power losses which are produced in the interior can be dissipated.

FIG. 3 shows the access module 1 without the rear housing part. As can be seen, the multipole plug connectors 8 are arranged on the printed circuit boards 6, to be precise in the area of the rectangular projection 16 from the cover and base of the front housing part 2. All of the printed circuit boards 6 can be connected to ground by means of a ground rail 17. For this purpose, the ground rail 17 has fork contacts 18, which are pushed onto the printed circuit board 6. The fork contacts are each associated with one printed circuit board 6 in pairs, and preferably make contact with it via contact pads which are arranged on both sides of the printed circuit board 6 and are then connected to corresponding ground conductor tracks on the printed circuit board. Furthermore, the ground rail 17 has two round profile fork contacts 13, and can be latched via the access module 1 onto a round profile mounting system, in order to produce a mechanical and electrical connection.

One particular embodiment of the connecting strips 5 makes it possible to wire up these connecting strips 5 in advance and to connect them retrospectively in a fully connected form to the printed circuit boards, so that the connecting strips effectively likewise act as prefabricated plugs.

Figure 4:
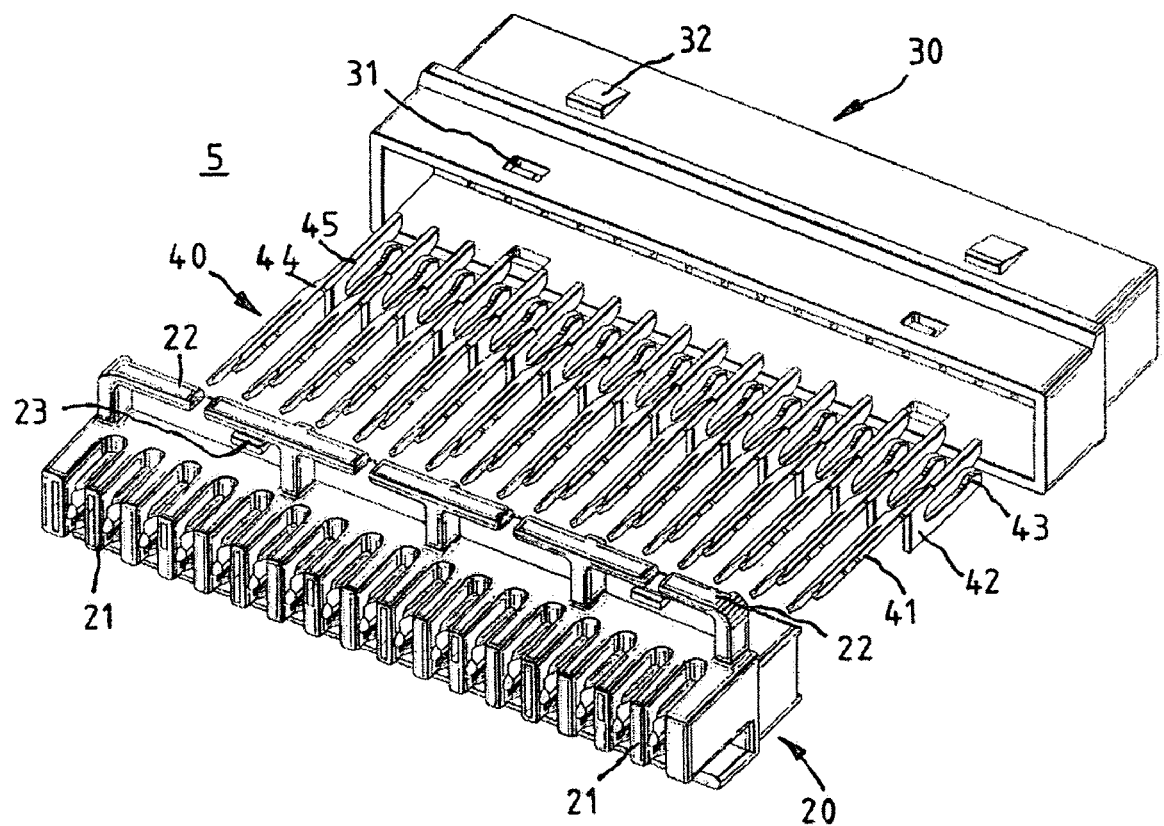
FIG. 4 shows an exploded illustration of a connecting strip for the insulation-displacement terminal contacts.

FIG. 4 shows a perspective illustration of the connecting strip 5. The connecting strip 5 has a first housing part 20, a second housing part 30 and a large number of contact elements 40. The first housing part 20 has clamping ribs 21, wire guidance eyes 22 and latching tabs 23. The second housing part 30 has latching holders 31 and latching tabs 32. Furthermore, that part of the second housing part 30 which faces the printed circuit board forms a chamber-like area, on whose inner faces ribs 33 are arranged at the top and bottom, as can partially be seen in FIG. 6, with the ribs 33 being chamfered in the front area. The chamfering allows the plug connector to be pushed onto the printed circuit board more easily. The contact elements 40 have an insulation-displacement terminal contact 41 and a fork contact 42, with the insulation-displacement terminal contact 41 and the fork contact 42 being rotated through about 45° with respect to one another. Each fork contact 42 has two rounded contact areas 43, which are curved inwards. The insulation-displacement terminal contacts 41 of the contact elements 40 are plugged into holders between the clamping ribs 21, where they are mechanically fixed. The second housing part 30 is then latched onto the first housing part 20, with the latching tabs 23 engaging in the latching holders 31. Furthermore, the contact elements 40 on the lower edges 44 and/or the lower edge 45 of the insulation-displacement terminal contacts 41 are mechanically supported on mechanical stops, which cannot be seen, in the second housing part 30.

Figure 5:
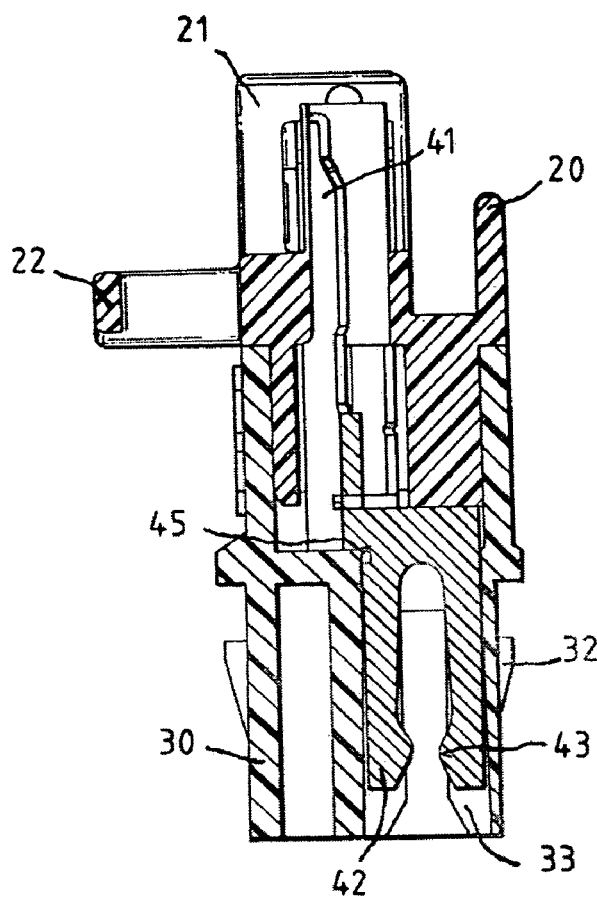
FIG. 5 shows a section illustration through the connecting strip.
Figure 6:
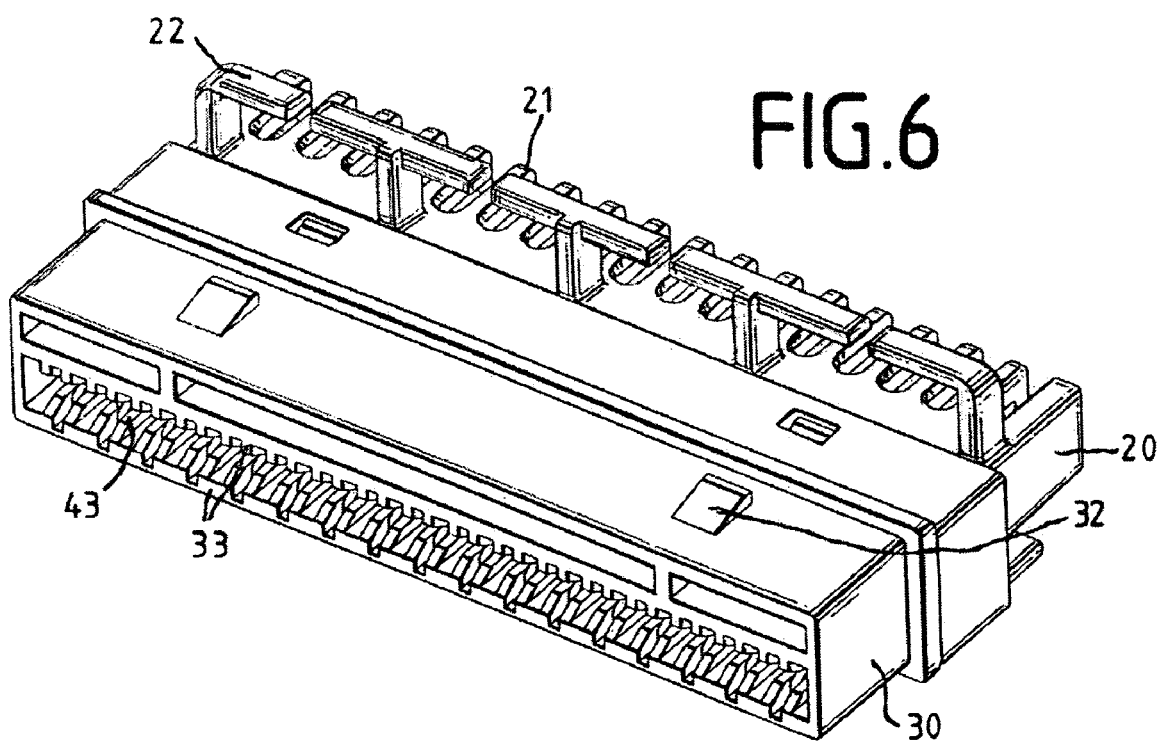
FIG. 6 shows a perspective rear view of the connecting strip.

This assembled state is illustrated in FIGS. 5 and 6. In this case, FIG. 5 shows a cross section through the connecting strip, with the section point being located between two clamping ribs. As can be seen in particular in FIG. 5, the lower edge 45 rests on a stop on the second housing part 30. The contact elements 40 are in this case held mechanically in the connecting strip 5 such that they are held captive, so that, in this state, a wire can be connected to an insulation-displacement terminal contact 41 without the connection forces being able to push the contact element 40 out. The mechanical connection forces are in this case absorbed by mechanical stops in the second housing part 30. The height of the ribs 33 is designed such that the contact areas 43 project. This ensures that an adequate contact pressure is produced between the contact area 43 and a contact pad which is arranged on the printed circuit board.

In principle, other embodiments of the connecting strip 5 are also feasible, which allow prior connection to wires and subsequent connection to the printed circuit boards.

LIST OF REFERENCE SYMBOLS

1 Access module
2 Front housing part
3 Rear housing part
4 Screws
5 Connecting strips
6 Printed circuit boards
7 Guide slots
8 Plug connector
9 Outward bulges
10 Holder
11 Latching openings
12 Latching clip
13 Round profile fork contacts
14 Lower edges
15 Openings
16 Projections
17 Ground rail
18 Fork contacts
20 Housing part
21 Clamping ribs
22 Wire guidance eyes
23 latching tabs
30 Housing part
31 Latching holders
32 Latching tabs
33 Ribs
40 Contact elements
41 Insulation-displacement terminal contacts
42 Fork contacts
43 Contact areas
44 Lower edges
45 Lower edge

What is claimed is:

1. An access module for telecommunications and data technology, having a housing in which externally accessible input and output contacts for connection of lines and wires are arranged, with the housing having a cavity in which at least one printed circuit board is arranged, with the input and output contacts being arranged on opposite end faces of the housing, and with the input contacts being in the form of at least one connecting strip with insulation-displacement terminal contacts, and the output contacts being in the form of at least one plug connector, wherein
the housing has at least two parts, with a front housing part being fitted with the input contacts and the printed circuit board, and a rear housing part being detachably connectable to the front housing part, with the rear housing part having at least one outward bulge, and with the plug connector being arranged behind the outward bulge.

2. The access module as claimed in claim 1, wherein the rear housing part has at least one cuboid outward bulge, with the plug connector or connectors being arranged within the cuboid outward bulge.

3. The access module as claimed in claim 1, wherein the rear housing part is formed from an electrically conductive material.

4. The access module as claimed in claim 1, wherein the access module has a ground rail, by means of which the printed circuit boards can be connected to ground.

5. The access module as claimed in claim 4, wherein the ground rail has fork contacts, via which contact is made with the printed circuit boards.

6. The access module as claimed in claim 4 or 5, wherein the ground rail is electrically connected to the rear housing part (3).

7. The access module as claimed in claim 4, wherein the ground rail has round fork contacts, via which the access module can be connected to a round profile mounting system.

8. The access module as claimed in claim 1, wherein the front housing part is formed from plastic.

9. The access module as claimed in claim 8, wherein the front housing part forms a base part for the connecting strips for the insulation-displacement terminal contacts.

10. The access module as claimed in claim 1, wherein the connecting strips are designed such that they can be connected to wires in advance.

* * * * *